United States Patent
Stabrey

(10) Patent No.: US 8,600,639 B2
(45) Date of Patent: Dec. 3, 2013

(54) YAW RATE CONTROL WITH SIMULTANEOUS MAXIMUM DECELERATION

(75) Inventor: Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/138,359

(22) PCT Filed: Dec. 21, 2009

(86) PCT No.: PCT/EP2009/067692
§ 371 (c)(1),
(2), (4) Date: Oct. 13, 2011

(87) PCT Pub. No.: WO2010/094365
PCT Pub. Date: Aug. 26, 2010

(65) Prior Publication Data
US 2012/0022758 A1   Jan. 26, 2012

(30) Foreign Application Priority Data
Feb. 18, 2009 (DE) .......... 10 2009 000 947

(51) Int. Cl.
*G06F 19/00* (2011.01)
*B62B 13/00* (2006.01)

(52) U.S. Cl.
USPC .................. 701/70; 280/28.11

(58) Field of Classification Search
USPC ............ 701/41, 70–91; 303/46, 116.4, 119.3; 180/197, 410, 242
See application file for complete search history.

(56) References Cited

U.S. PATENT DOCUMENTS

| 5,694,319 A * | 12/1997 | Suissa et al. ............ 701/41 |
| 6,017,101 A | 1/2000 | Matsuda |
| 6,122,584 A | 9/2000 | Lin et al. |
| 7,877,177 B2 * | 1/2011 | Kueperkoch et al. ........ 701/30.3 |
| 2007/0038408 A1 * | 2/2007 | Gaunt et al. ............. 702/138 |
| 2007/0112477 A1 * | 5/2007 | Van Zanten et al. ......... 701/2 |
| 2008/0189016 A1 * | 8/2008 | Bernzen ................. 701/46 |
| 2009/0062991 A1 * | 3/2009 | Hayashikawa et al. ....... 701/48 |
| 2009/0236905 A1 * | 9/2009 | Maeda et al. .............. 303/146 |
| 2010/0004815 A1 * | 1/2010 | Ewerhart et al. ........... 701/35 |

FOREIGN PATENT DOCUMENTS

| DE | 36 25 392 | 8/1987 |
| EP | 0939016 | * 2/1999 |
| EP | 0 939 016 | 9/1999 |
| EP | 1 541 435 | 6/2005 |
| WO | WO 99/58382 | 11/1999 |
| WO | WO 02/053425 | 7/2002 |
| WO | WO-2006-106009 | * 10/2006 |
| WO | WO2006106009 | * 10/2006 |

* cited by examiner

*Primary Examiner* — James Trammell
*Assistant Examiner* — Muhammad Shafi
(74) *Attorney, Agent, or Firm* — Kenyon & Kenyon LLP

(57) ABSTRACT

A method for stabilizing a vehicle in a transverse direction, in which: for a first braking force distribution in which each vehicle wheel is braked using the maximum braking force transmittable to the road surface in the current driving situation, the yawing moment acting on the vehicle is ascertained; for at least a second braking force distribution that differs from the first braking force distribution in that at least one wheel is not braked using the maximum braking force, the yawing moment acting on the vehicle is ascertained; a setpoint yawing moment is ascertained; and from at least the first and second braking force distributions, the braking force distribution whose associated yawing moment comes closest to the setpoint yawing moment is set at the vehicle.

11 Claims, 3 Drawing Sheets

YAW RATE CONTROL WITH SIMULTANEOUS MAXIMUM DECELERATION

BACKGROUND OF THE INVENTION

Today, numerous motor vehicles have electronic stability programs, which increase driving safety by actively intervening in the vehicle motion. In this context, braking actions at the individual wheels are normally used to control the yawing motion of the vehicle in a stabilizing manner in the extreme range of driving dynamics, and thus, to keep the vehicle controllable for the driver. In so doing, the braking actions are set such that they are as unnoticeable as possible and result in only a slight reduction in speed.

Published German patent application document DE 36 25 392 A1 describes a closed-loop control system for preventing skidding movements of a motor vehicle, in which skidding movements are automatically correctible without the necessity of steering movements. This is achieved by selective deceleration and/or accelerations and/or a correction of the wheel angle of individual wheels.

BRIEF SUMMARY OF THE INVENTION

The present invention relates to a method for stabilizing a vehicle in a transverse direction or stabilizing a vehicle with respect to an angular motion about its vertical axis, in which
  for a first braking force distribution in which each vehicle wheel is braked using the maximum braking force transmittable to the road surface in the current driving situation, the yawing moment acting on the vehicle is ascertained;
  for at least a second braking force distribution that differs from the first braking force distribution in that at least one wheel is not braked using the maximum braking force, the yawing moment acting on the vehicle is ascertained;
  a setpoint yawing moment is ascertained; and
  from at least the first and second braking force distributions, the braking force distribution whose associated yawing moment comes closest to the setpoint yawing moment is set at the vehicle.

Known electronic stability programs decelerate the vehicle only slightly using their braking actions at the individual wheels. If an accident cannot be prevented in spite of these braking actions, then, in some situations, a stabilization action resulting in a sharp reduction in speed would have been advantageous. A stabilization action associated with a sharp reduction in speed has the following advantages:
  if a collision occurs in spite of the stabilization actions, then the lower vehicle speed results in a lower risk of injury.
  a slower vehicle exhibits a higher damping of the yawing movement, which means that the stabilization is made easier for both the closed-loop control system and the driver.
  the deceleration expands the handling options of the driver, since a longer period of time elapses up to a possible collision. In this manner, the driver has more time for actions preventing an accident or decreasing the severity of an accident.

An advantageous refinement of the present invention is characterized in that the yawing moment acting on the vehicle is ascertained from the portions of the yawing moment generated by the individual wheels. In particular, the yawing moment may be ascertained in a simple manner from the sum of the yawing moment portions.

An advantageous refinement of the present invention is characterized in that the yawing moment portions are ascertained from at least quantities describing the vehicle geometry, the wheel angle, the longitudinal force acting on the wheel and the transverse force acting on the wheel.

An advantageous refinement of the present invention is characterized in that the maximum force transmittable by the tires to the road surface is ascertained from at least vehicle geometry data, the vehicle mass and the current transverse and longitudinal accelerations.

An advantageous refinement of the present invention is characterized in that the maximum braking force transmittable to the road surface is ascertained from the maximum force transmittable to the road surface and the slip angle of the tire. The slip angle and numerous other variables are already available in conventional electronic stability programs.

An advantageous refinement of the present invention is characterized in that the setpoint yawing moment is ascertained from at least the wheel angle and the longitudinal speed of the vehicle.

Furthermore, the present invention includes a device having means that are configured to implement the method according to the present invention.

The advantageous embodiments of the method according to the present invention also manifest themselves as advantageous embodiments of the device of the present invention, and vice versa.

BRIEF DESCRIPTION OF THE DRAWINGS

For a simulated lateral rear-end collision by which the vehicle is set into rotation about its vertical axis.

Figure 3:
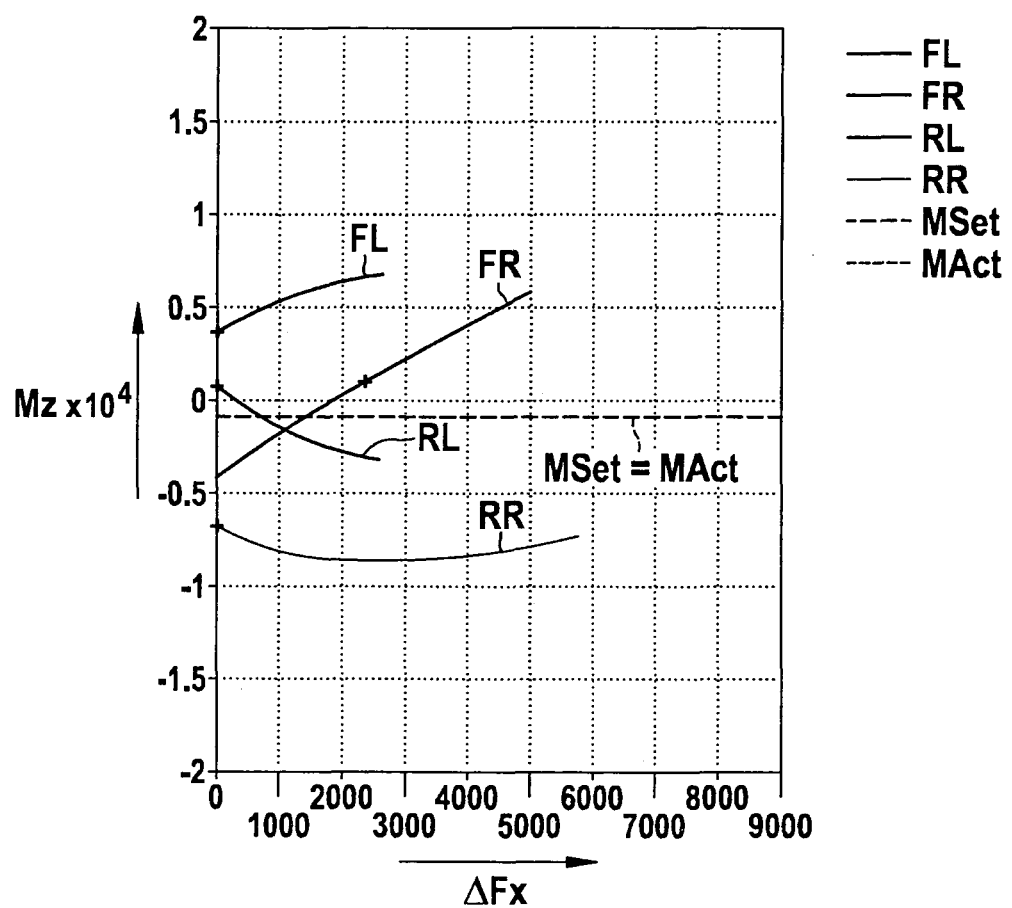

On the other hand,

FIG. 3 shows an unstable driving situation, in which the setpoint yawing moment may be reached by reducing braking force at the right front wheel to stabilize the vehicle.

DETAILED DESCRIPTION OF THE INVENTION

The braking actions independent of the driver, which are carried out within the scope of an electronic stability program, are generally selected to bring about only a slight deceleration of the vehicle. In contrast to that, brake assist systems and emergency braking systems generate very high deceleration values up to the physical maximum, but in so doing, dispense with generating a stabilizing yawing moment.

The present invention relates to a method and a device for setting a stabilizing yawing moment in a motor vehicle, the braking actions performed being simultaneously intended for generating a vehicle deceleration that is as large as possible. If an accident cannot be prevented by an action of an electronic stability program in which a vehicle is decelerated slightly, then it is possible for a collision to occur at a high speed and with a correspondingly high risk of injury. However, if a stabilization action is performed so that a rapid and sharp reduction in speed simultaneously occurs, then this has several advantages:
- if an accident occurs in spite of the stabilization actions, then a lower risk of injury is also produced by the lower speed.
- a slow vehicle exhibits a higher damping of the yawing motion, which means that the stabilization is made easier for both the electronic stability program and the driver.
- the options for action of the driver are expanded by the deceleration of the vehicle, since a longer time elapses up to the collision with an object at a fixed location. This may allow the driver to act to reduce a severity of the accident.

Stabilization actions with simultaneous maximum deceleration are then appropriate, when a loss of control of the driver can be assumed, and therefore, a risk of collision exists whose severity may be reduced by decelerating the vehicle. In the simplest case, for example, it may be assumed that control is lost when an airbag is deployed, due to an initial collision, and the driver is thereby temporarily unable to act.

Figure 1:
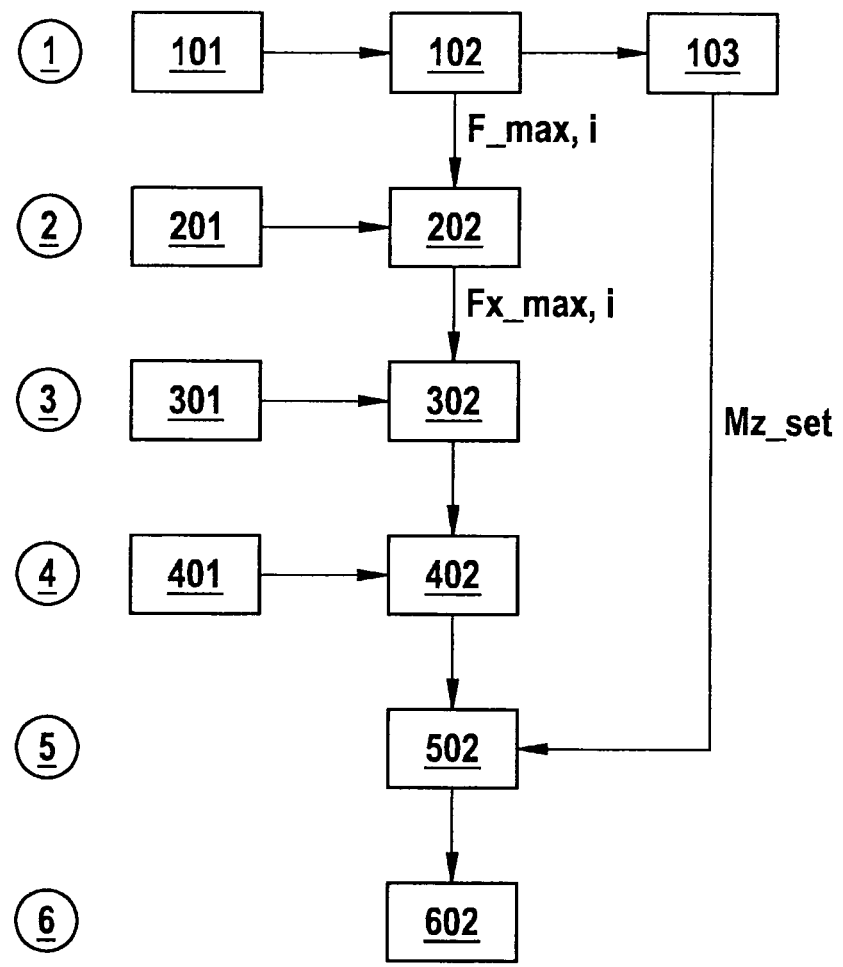
FIG. 1 shows a flow chart for stabilization with maximum deceleration.

The operation of a specific embodiment of the stabilization method according to the present invention is represented in FIG. 1. In this context, it is assumed that the setpoint yawing moment to be set is ascertained by a primary controller entity, which implements, for example, closed-loop yaw rate control. The objective of the method is to implement the requested yawing moment, such that the vehicle thereby undergoes maximum deceleration. This may be achieved by fully braking all four wheels in the initial state and, therefore, setting the maximum deceleration. The requested yawing moment is generated by selectively debraking the individual wheels out of this state.

In FIG. 1, the method steps 1 through 6 are numbered on the left side. In step 1, maximum forces $F\_max,i$ transmittable by the four wheels of the motor vehicle to the road surface are ascertained in block 102, index i indicating the respective wheel. The forces are mainly a function of the coefficient of friction between tire and road surface and the normal force acting on the tire. The maximum transmittable forces are calculated from quantities provided by block 101, which may include, e.g., vehicle geometry data, the vehicle mass and measured transverse and longitudinal accelerations. The normal forces are calculated, for example, from the static wheel loads, in view of the pitching and rolling moments resulting from transverse and longitudinal accelerations. The coefficient of friction may be estimated on the basis of the measured variables available in the electronic stability program.

In step 2, the maximum longitudinal force component $Fx\_max,i$ at all four wheels is determined in block 202. In this context, the total force acting at a locked wheel is directed oppositely to the velocity vector at the center of tire contact. Maximum longitudinal force component $Fx\_max,i$ may be calculated from maximum force $F\_max,i$ and the slip angle at the wheel. The slip angles are calculated on the basis of the measured and estimated variables available in the system.

In step 3, the longitudinal forces are varied, in block 302, between zero and the maximum value calculated beforehand for each wheel. For each variation, the transverse force components remaining in the case of full utilization of the tire force potential are calculated using the Kamm's circle.

Figure 2:
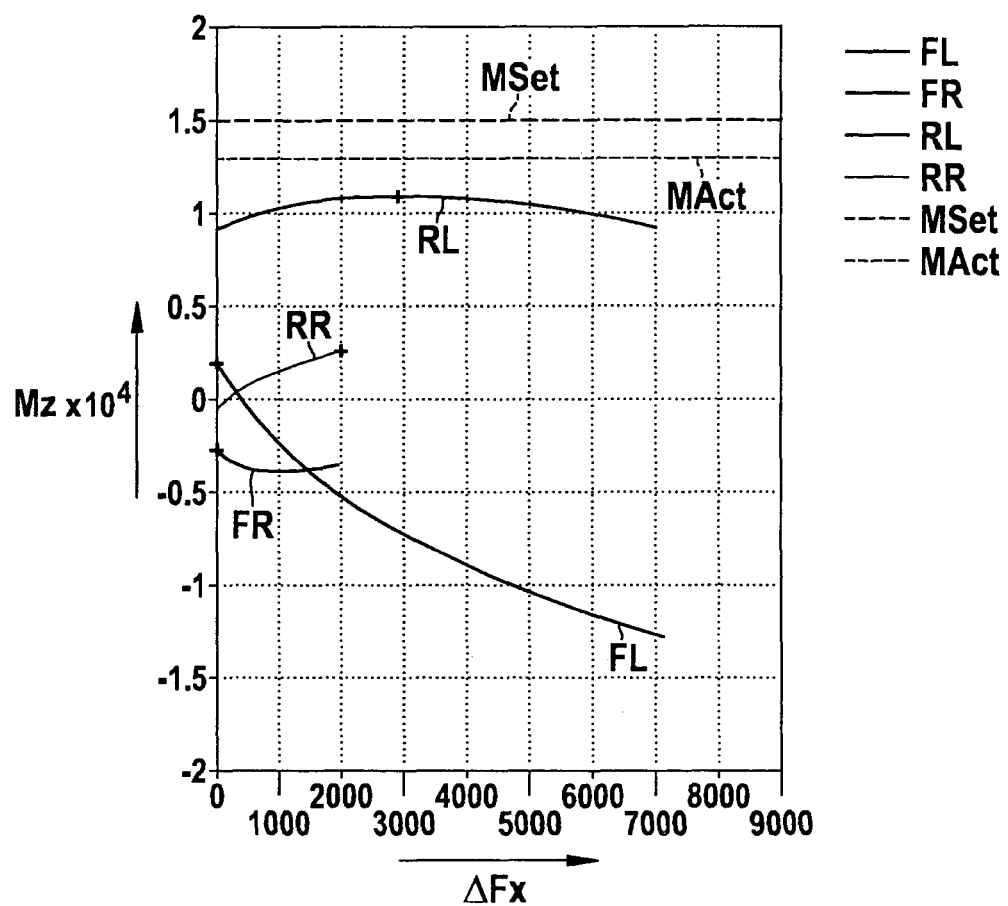
FIG. 2 shows the yawing moment portions of the individual wheels as a function of the reduction in braking force, starting from the maximum braking force. In the example shown, within the scope of the maximum forces transmittable by the tires, an actual yawing moment corresponding to the setpoint yawing moment is not able to be achieved in any braking-force reduction constellation.

In step 4, in block 402, the yawing moments generated by the wheels are calculated for these variations, from the transverse and longitudinal forces. In FIGS. 2 and 3, these are each plotted in the ordinate direction as a function of the debraking $\Delta Fx$ plotted in the abscissa direction. A debraking of zero ($\Delta Fx=0$) means a maximum braking force present at the respective wheel.

In the next step 5, the debraking that minimizes the difference between the setpoint yawing moment and the sum of all of the yawing moment portions is ascertained for each wheel in succession. In FIG. 2, a high setpoint yawing moment $Mz=MSet=1.5 \cdot 10^4$ Nm is requested. The result of this is that the left front (FL="front left") and right front (FR="front right") wheels remain fully braked, since debraking would reduce the yawing moments generated by these wheels. Right rear wheel RR (RR="rear right") generates the highest yawing moment when it is completely debraked, i.e., a braking force of zero is set. The left rear wheel (RL="rear left") generates a maximum yawing moment in the case of partial debraking. In the present case in FIG. 2, the requested yawing moment is not achievable via braking actions, as is apparent in light of total yawing moment MAct, which represents the sum of the four maximum achievable yawing moment portions.

In order to arrive at a better understanding of FIG. 2, this is explained here again in detail. In the abscissa direction, debraking $\Delta Fx$ is plotted in the physical unit N; in the ordinate direction, yawing moment Mz is plotted in the physical unit Nm. A debraking of zero (i.e., $\Delta Fx=0$) means that all of the wheels are braked at a maximum. In the driving situation present in FIG. 2, the vehicle was set into a clockwise rotation about the vertical axis due to a side collision at the rear end. The driving situation resembles the one in the case of a right-hand curve. The vehicle body tilts in the outer direction of the curve, and therefore, the wheels on the outside of the curve are also more heavily loaded. In the case of a right-hand curve, the wheels on the outside of the curve are the left wheels. The more highly loaded wheels may also exert greater braking forces. In FIG. 2, this manifests itself in that the curves of wheels RL (left rear wheel) and FL (left front wheel) may be unloaded up to a force of 7000 N ($\Delta Fx=7000$ N); therefore, the range covered by the two curves extends from $\Delta Fx=0$ to $\Delta Fx=7000$ N. Right wheels RR (right rear wheel) and FR (right front wheel) are less loaded, may each transmit a maximum braking force of 2000 N and may therefore be unloaded by a maximum of $\Delta Fx=2000$ N.

The four operating points set at the wheels in FIG. 2 are denoted by the symbol "+." A maximum yawing moment is reached, when wheels FR and FL are not debraked (in this case, the maximum yawing moment is present at $\Delta Fx=0$), RL is debraked by approximately 3000 N and, with 2000 N, RR is debraked by the maximum value possible for this wheel, i.e., this wheel is not braked. However, sum MAct of the yawing moment portions setting in via the selected operating points is not enough to reach the desired setpoint yawing moment MSet, i.e., MAct<MSet.

On the other hand, FIG. 3 shows a situation in which the requested yawing moment may be produced. In this case, the three wheels RR, FL and RL remain fully braked and only wheel FR must be debraked by app. 2300 N. Therefore, in this case, stabilization is implemented with simultaneous, sharp deceleration.

In the following, FIG. 1 is explained once more in detail.

In the left column, steps 1 through 6 of the method are numbered consecutively. In the third column that includes blocks 102, 202, 302, 402, 502 and 602, the steps of the method are represented. Using blocks 101, 201, 301 and 401, the second column from the left shows the main variables used for the individual method steps.

In block 102, the calculation of maximum forces $F\_max,i$ transmittable at the individual wheels is performed. To that end, vehicle geometry data, the vehicle mass and the measured transverse and longitudinal accelerations are provided in block 101. In block 202, a calculation of maximum longitudinal force Fx_max,i transmittable at the individual wheels is subsequently performed. These are the forces transmittable in the case of full braking. For that purpose, the estimated slip angles are provided in block 201. In block 302, the longitudinal forces are varied. To that end, starting out from the state of full brake application, debraking instances between 0% (=full braking) and 100% (=wheel not braked) are considered. In addition, the transverse forces resulting in each instance are calculated. For this, the data of the Kamm's circle and a simple transverse force model for small slip angles are provided as additional input data in block 301.

In block 402, the yawing moments generated by the individual wheels for the debraking variations considered in block 302 are calculated as a function of the longitudinal and transverse forces. In block 401, the wheel angle and vehicle geometry data are provided as additional input data.

In block 502, the debraking variation that minimizes the deviation between the sum of all yawing moment portions and the setpoint yawing moment is selected.

To that end, setpoint yawing moment Mz_set, which is ascertained by a superordinated vehicle dynamics controller, is provided by block 103.

In block 602, the braking force distribution belonging to the debraking variation selected in block 502 is set at the individual wheels by a subordinate brake force regulator or slip controller. In particular, in an advantageous refinement, the brake force regulator may be configured such that locking of the wheels is prevented, i.e., the braking instances of the individual wheels are braking instances that prevent locking.

In an advantageous embodiment, it is possible to execute the stabilization method of the present invention only after the presence of an initial collision of the vehicle, but not for stabilization in the absence of a collision.

Of course, the maximum transmittable forces may also be ascertained using the sensor technology contained in "intelligent tires."

What is claimed is:

1. A method for stabilizing a vehicle in a transverse direction, independent of driver control, comprising:
    ascertaining a yawing moment acting on the vehicle for a first braking force distribution in which each vehicle wheel is braked using the maximum braking force transmittable to the road surface in the current driving situation;
    ascertaining a yawing moment acting on the vehicle for at least a second braking force distribution that differs from the first braking force distribution in that at least one wheel is not braked using the maximum braking force;
    ascertaining a setpoint yawing moment; and
    setting, from at least the first and second braking force distributions, the braking force distribution whose associated yawing moment comes closest to the setpoint yawing moment at the vehicle.

2. The method as recited in claim 1, wherein the yawing moment acting on the vehicle is ascertained from yawing moment portions generated by the individual wheels.

3. The method as recited in claim 2, wherein the yawing moment acting on the vehicle is ascertained from the sum of the yawing moment portions.

4. The method as recited in claim 2, wherein the yawing moment portions are ascertained at least variables describing the vehicle geometry, the wheel angle, the longitudinal force acting on the wheel and the transverse force acting on the wheel.

5. The method as recited in claim 1, wherein the maximum force transmittable by the tires to the road surface is ascertained from at least vehicle geometry data, the vehicle mass and the current transverse and longitudinal accelerations.

6. The method as recited in claim 4, wherein the momentum braking force transmittable to the road surface is ascertained from the maximum force transmittable to the road surface and the slip angle of the tire.

7. The method as recited in claim 1, wherein the setpoint yawing moment is ascertained from at least the wheel angle and the longitudinal speed of the vehicle.

8. The method as recited in claim 1, wherein the braking instances of the individual wheels are braking instances that prevent locking.

9. The method as recited in claim 1, wherein the stabilizing method is only executed after occurrence of a collision.

10. The method as recited in claim 1, wherein the maximum braking force maximally transmittable to the roadway is ascertained using sensor technology contained in the tire.

11. A device for stabilizing a vehicle in a transverse direction, independent of driver control, comprising:
    an ascertaining arrangement to ascertain (i) a yawing moment acting on the vehicle for a first braking force distribution in which each vehicle wheel is braked using the maximum braking force transmittable to the road surface in the current driving situation, (ii) a yawing moment acting on the vehicle for at least a second braking force distribution that differs from the first braking force distribution in that at least one wheel is not braked using the maximum braking force, and (iii) a setpoint yawing moment; and
    a setting arrangement to set, from at least the first braking force distribution and the second braking force distribution, the braking force distribution whose associated yawing moment comes closest to the setpoint yawing moment at the vehicle.

* * * * *